United States Patent

Winter et al.

[15] 3,659,083

[45] Apr. 25, 1972

[54] BINARY CODED READOUT DEVICE

[72] Inventors: Ronald C. Winter, Johnson Creek; Enno A. Knief, Watertown, both of Wis.

[73] Assignee: Cutler-Hammer, Inc., Milwaukee, Wis.

[22] Filed: Sept. 3, 1970

[21] Appl. No.: 69,406

[52] U.S. Cl. ........................235/92 EA, 235/92 C, 235/92 R, 235/92 BD, 340/379, 340/347 P

[51] Int. Cl. ........................................................G06m 1/27

[58] Field of Search.........................235/92 C, 92 EA, 92 BD; 340/378, 9, 347 P

[56] References Cited

UNITED STATES PATENTS

| | | | |
|---|---|---|---|
| 3,445,636 | 5/1969 | Richards | 235/92 BD |
| 3,304,414 | 2/1967 | Ham et al. | 235/92 BD |

*Primary Examiner*—Thomas A. Robinson
*Assistant Examiner*—Joseph M. Thesz, Jr.
*Attorney*—John W. Michael, Gerrit D. Foster, Bayard H. Michael, Paul R. Puerner, Joseph A. Gemignani, Andrew O. Riteris and Spencer B. Michael

[57] ABSTRACT

A binary coded readout device has a printed circuit pattern on a circuit board with conductive segments in adjoining sectors which are wiped by contact members on a rotating wiper. There are two angularly spaced wiper contact positions per sector in the outer circle of contact member travel. The rotating wiper has an axis of rotation which is eccentric to its symetrical center and the contact members on the oppositely extending long arms are thus angularly spaced so that with each step of the wiper one of these contact members will come to rest on the clockwise first of these two contact positions in sector N and the other contact number will come to rest on the clockwise second of these two contact positions in a clockwise advanced sector N+4.

6 Claims, 5 Drawing Figures

PATENTED APR 25 1972

3,659,083

SHEET 1 OF 2

Inventors
Ronald C. Winter
Enno A. Knief
By [signature]
Attorney

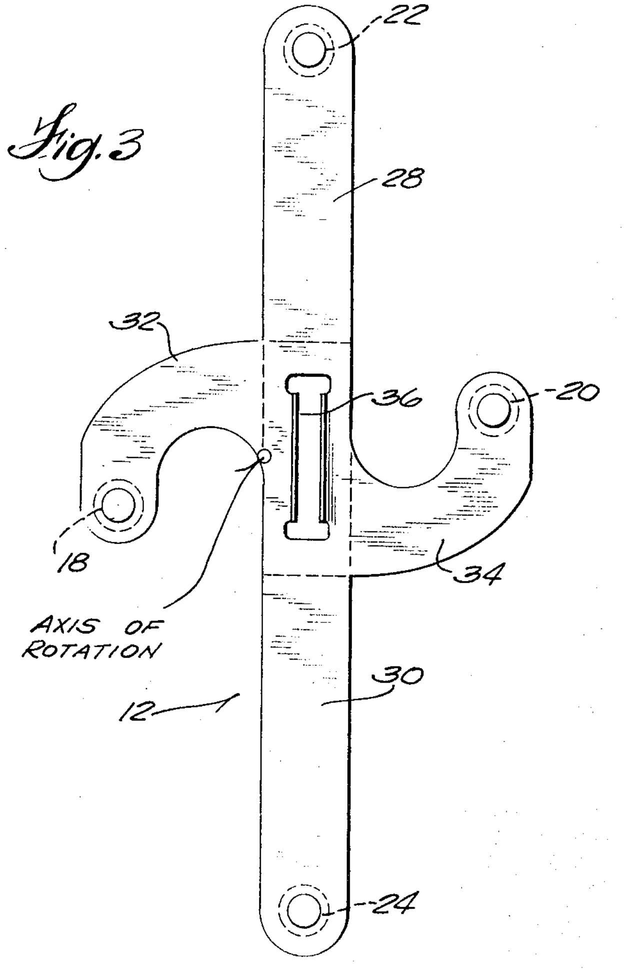
Fig. 3
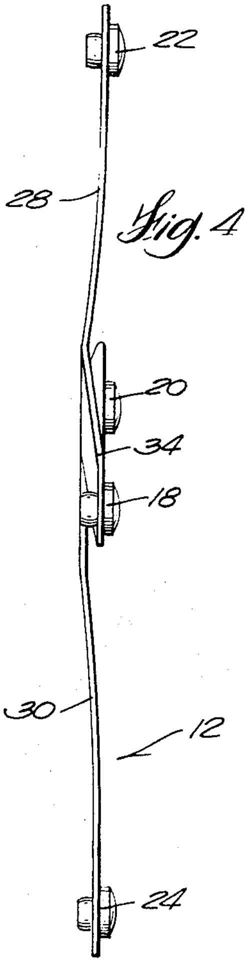
Fig. 4
| WIPER POSITION | COMMON CONNECTIONS TO BCD OUTPUT LEADS | | | | |
|---|---|---|---|---|---|
| | 1 | 2 | 4 | 8 | Z |
| 0 | | | | | O |
| 1 | O | | | | |
| 2 | | O | | | |
| 3 | O | O | | | |
| 4 | | | O | | |
| 5 | O | | O | | |
| 6 | | O | O | | |
| 7 | O | O | O | | |
| 8 | | | | O | |
| 9 | O | | | O | |
Fig. 5
Inventors
Ronald C. Winter
Enno A. Kniel
By [signature]
Attorney

BINARY CODED READOUT DEVICE

BACKGROUND OF THE INVENTION

1. Field of the Invention

This invention relates generally to a binary coded readout device and more particularly to an improved printed circuit pattern and a cooperative rotating wiper.

2. Description of the Prior Art

Binary readout devices for use with single wheel decade counters are shown and described in U.S. Pats. Nos. 3,423,750 and 3,445,636. Neither of these patents show a printed circuit pattern with two angularly spaced wiper contact positions in the outer circle of the contact travel for each sector. Neither of these patents show the mounting of the wiper with the contact members on its long arms angularly spaced so that with each step one of the contact members will rest on one wiper contact position within a sector and the other will rest on another contact position in another sector.

BRIEF DESCRIPTION OF THE DRAWING

In The Drawings:

FIG. 3 is a top plan view of the rotating wiper which carries the contact members which ride on the printed circuit of FIG. 1, the axis of rotation is shown offset from the symetrical center;

FIG. 4 is a side view of the wiper of FIG. 3; and

FIG. 5 is a table showing wiper positions and connections of the common conductors to the BCD output leads.

DESCRIPTION OF THE PREFERRED EMBODIMENT

Since the stepping drive for the wiper and number wheel are well known to those skilled in this art (see U.S. Pats. Nos. 3,238,359 and 3,295,382 both for electro mechanical drives and applicant's pending application Ser. No. 2,898 for manual push button drive) no illustration or description of it is included. The stepping drive advances the rotating wiper in angular steps of 36°.

The essential feature of this invention resides in the configuration of the printed circuit and angular spacing of the contact members which are rotated over the surface of the printed circuit in ten steps, in an outer circle of contact travel one step for each sector.

Figure 2:
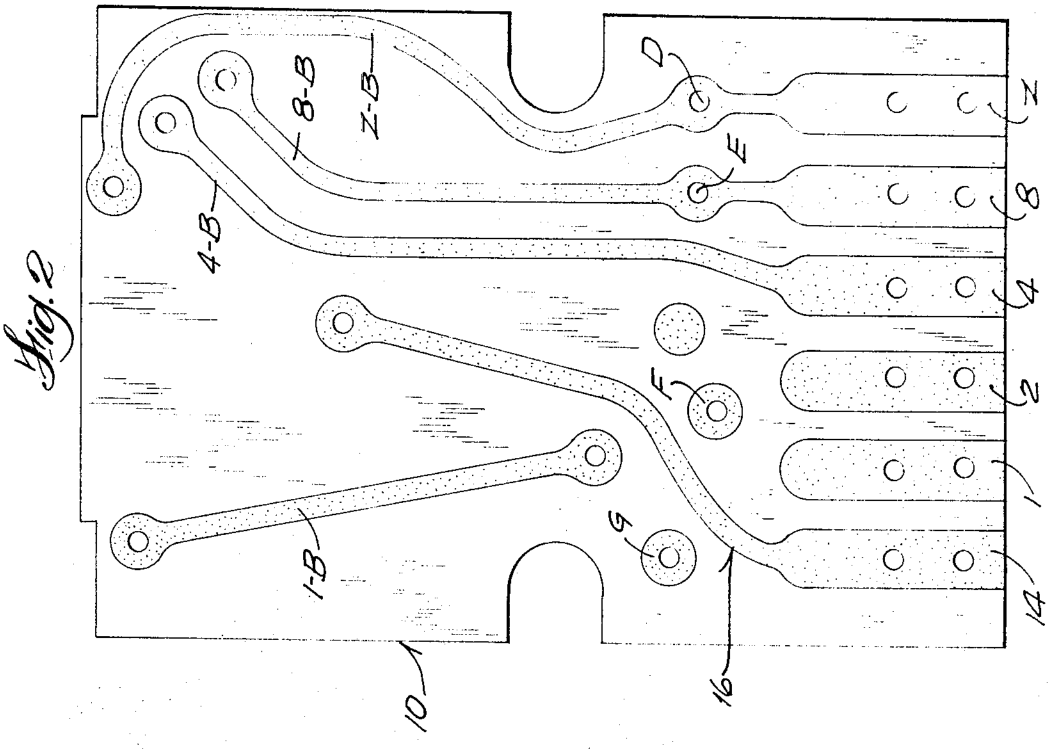
FIG. 2 is a bottom plan view of the circuit board of FIG. 1.
Figure 1:
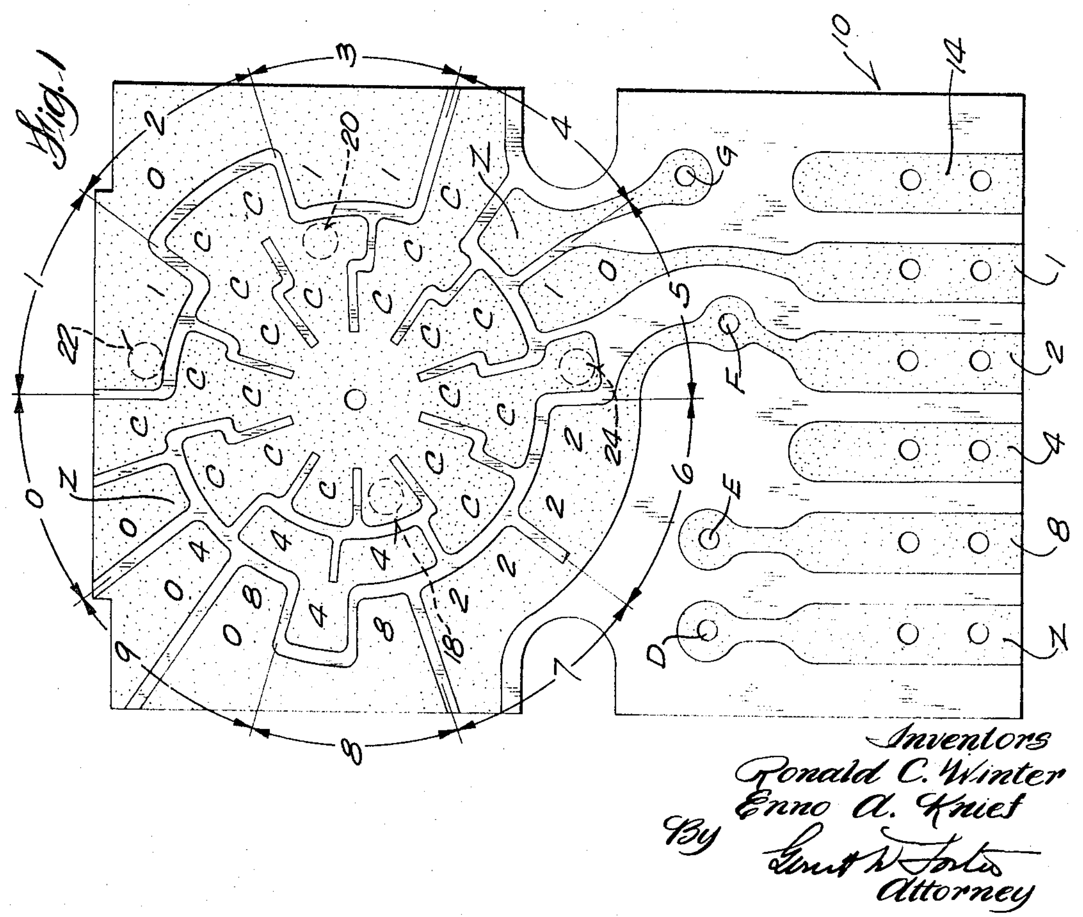
FIG. 1 is a top plan view showing a circuit board having a printed circuit with a configuration of electrical conductors for providing a binary coded readout embodying the present invention, the location of the contact members at position 1 being shown by broken-line circles.

Referring to the drawings by reference numerals, a printed circuit board 10 is designed for insertion in a counter module to cooperate with a rotary wiper 12 (see, FIG. 3) to provide a binary coded electrical readout of the angular position of a number wheel (not shown). As shown in FIG. 1 the printed circuit is divided into 10 sectors of 26° angular extent. Each sector is identified by a circular dimension line and designated as 0 to 9 inclusive. The circuit board as shown in FIG. 1 has a common conductor in the form of a wheel with a central hub and 10 radially extending angularly spaced sections. The sections of this common conductor are labeled in FIG. 1 with the letters C which are placed approximately in the circular paths of travel of the four contact members. As seen in FIG. 2, the common conductor is electrically connected to a common output input lead 14 by a through-the-board connection from the central hub of the common conductor to a conductor 16. There are four circular paths of travel for the contact members as they are moved over the printed circuit board 10 by the rotary wiper 12. These contact members are all shown in FIG. 3. The inner path is that of the innermost contact member 18. The second path is that of the contact member 20. The third and fourth paths are respectively those of the contact members 22 and 24. The inner portions of all ten of the sections of the common conductor lie in the inner path. The intermediate portions of eight of such sections of the common conductor lie in the second path in sectors 0 to 7, inclusive. The outer portions of four of such sections of the common conductor lie in the third and fourth paths in sectors 0, 2, 4 and 5. There are three conductive areas labeled 1 (duplicated in some areas) which have inner portions lying in the third and fourth paths in sectors 1, 3 and 5. These are connected to the output lead 1 as shown in FIGS. 1 and 2, using through-the-board connections and conductor 1–B. There are two conductive areas labeled 2 (duplicated in some areas) which lie in the third and fourth paths in sectors 6 and 7. These are connected to output lead 2 as shown in FIG. 1. There are four conductive areas labeled 4. These have inner portions lying in the second path in sectors 7, 8 and 9, and outer portions lying in the third and fourth paths in sectors 8 and 9. These conductive areas are connected to the output lead 4 as shown in FIG. 2 using through-the-board connections and conductor 4–B. There are two conductive areas labeled 8. These lie in the third and fourth paths in sectors 8 and 9. They are connected to the output lead 8 as shown in FIG. 2 using through-the-board connections and conductor 8–B. There are two conductive areas labeled Z. These lie in the third and fourth paths in sectors O and 4. They are connected to the output lead Z as shown in FIG. 2 using through-the-board connections and conductor Z–B.

In wiper position 1 (see FIG. 5) the position of contact members 18 (innermost path), 20 (second path), and 22 and 24 (third and fourth paths) are indicated by broken line circles on FIG. 1 referenced by the contact numbers. This wiper is formed from a blank of metal having spring type characteristics. It has two long arms 28 and 30 (30 being somewhat longer) and two short curved arms 32 and 34. It has a central opening 36 of oblong shape which receives a mounting projection on the shaft of a stepping drive. The center of rotation of such shaft and of the wiper 26 is offset, to the left as shown, from the longitudinal axis of the opening 36. By reason of this offset, the contact members 22 and 24 are angularly spaced from a diametric line passing through the center of rotation in a 12 o'clock position. The result is that in the sector 1 position the contact member 22 will be at rest as shown in FIG. 1 in the anti-clockwise half portion of conductive area 1 in sector 1 while the contact member 24 will be at rest on conductive area C in the clockwise half portion of sector 5.

The contact members 18 and 20 are also slightly offset from a diametric line passing through the center of rotation, however this is not essential to the operation of this device. The important result of the offset of the center of rotation from the geometric center of the wiper 12 is that contact member 18 is on a radius to the center of rotation shorter than that of contact member 20. Thus contact member 18 travels in the inner path and contact member 20 travels in the second path. Since contact member 22 is on the shorter of and contact member 24 is on the longer of the two long arms 28 and 30, they travel respectively in the third and fourth paths.

The table shown in FIG. 5 shows the position of the wiper 12 in each of the sectors 0 to 9 inclusive and the common connection to the BCD output leads. In position 0 the contact members 18 and 20 rest on conductive segments C and contact members 22 and 24 rest on conductive segments Z and there is a readout circuit to Z for the BCD Count 0. In position 1 (as shown in FIG. 1) contact members 18, 20 and 24 all rest on segments C and contact member 22 rests on segment 1 and there is a readout circuit established to output lead 1 to form the signal for BCD count 1. In position 2 contact members 18, 20 and 22 rest on segments C and contact member 24 rests on segment 2 to establish a readout circuit to output 2 to form the signal for BCD Count Z 2. In position 3, contact members 18 and 20 rest on segments C, contact member 22 rests on segment 1, and contact member 24 rests on segment 2 to establish circuits to output leads 1 and 2 to form the signal for BCD Count 3. In position 4, contact members 18, 20 and 22 rest on segments C and contact member 24 rests on segment 4 to establish a readout circuit to output lead 4 to form the signal for BCD Count 4. In position 5, contact members 18 and 20 rest on segments C, contact member 22 rests on segment 1 and contact member 24 rests on segment 4 to establish circuits to output leads 1 and 4 to form the signals for BCD Count 5. In position 6, contact members 18 and 24 rest on segments C, contact member 22 rests on segment 2 and contact member 20 rests on segment 4 to establish circuits to output leads 2 and 4 for BCD Count 6. In position 7, contact member 18 rests on segment C, contact member 20 rests on segment 4, contact member 22 rests on segment 2 and contact member 24 rests on segment 1 to establish BCD Count 7. In position 8, contact members 18, 20 and 24 rest on segments C and contact member 22 rests on segment 8 to establish a circuit to output lead 8. In position 9, contact members 18 and 20 rest on segments C, contact member 24 rests on segment 1, and contact member 22 rests on segment 8 to establish circuits to output leads 1 and 8 and establish BCD Count 9.

In addition to the BCD Counts from 1 to 9 set forth in FIG. 5 and additional BCD Count 10 can be readily established by the printed circuit shown in FIG. 1. When jumper wires are added connecting conductive areas D to E and F to G, the conductive segment Z in sector 0 is connected to output terminal 8 and the conductive segment Z in sector 4 is connected to output terminal 2. When the wiper is in position 0 the contact members 22 and 24 will rest on the conductive segments Z in sectors 0 and 4, the contact members 18 and 20 will rest on conductive segments C in sectors 6 and 2 to establish circuits to output leads 2 and 8 and establish a special readout signal.

The essential feature of this invention resides in the design of the printed circuit pattern in connection with a wiper with contact members angularly offset from a diametric line passing through its axis of rotation so that in each step one of such contact members stops in an angularly retarded position of a conductive segment in one sector while the other contact member stops in an angularly advanced position of a conductive segment in a sector angularly advanced from the said one sector. Each contact member travels on its own circular path to reduce wear on the conductive segments.

We claim:

1. A binary coded readout device comprising:

a. a printed circuit board with angularly spaced conductive segments arranged in a circular path divided into 10 sectors, said segments having angularly retarded and advanced first and second contact stop positions;

b. a rotatably mounted wiper having radially projecting diametrically opposite arms, said arms provided with contact members sliding on said conductive segments, said contact members being angularly offset from the diametric line passing through the axis of rotation of said wiper and said contact members; said wiper being advanced in steps from sector to sector, and in an at rest position of said wiper one of said contact members rests in a first position on a conductive segment in a first sector and the other of said contact members rests in a second position on a conductive segment in a second sector.

2. A binary coded readout device as defined in claim 1 wherein:

a. some of said conductive segments are connected to an output lead for the digit (1); and b. others of said conductive segments are connected respectively to output leads for the digits (2), (4) and (8).

3. A binary coded readout device as defined in claim 1 wherein:

some of said conductive segments are connected to an output lead for the digit (1).

4. A binary coded readout device as defined in claim 2 wherein:

a. the conductive segments connected to the output lead for digit (1) are positioned in sectors designated (1), (3) and (5);

b. the conductive segments connected to the output lead for digit (2) are positioned in sectors designated (6) and (7); and c. the conductive segments connected to the output lead for digit (4) and the conductive segments connected to the output lead for digit (8) are positioned in sectors designated (8) and (9).

5. A binary coded readout device as defined in claim 2 wherein:

a. the conductive segments connected to the output lead for digit(1) are positioned in sectors designated (1), (3) and (5);

b. the conductive segments connected to the output lead for digit (2) are positioned in sectors designated (6) and (7);

c. the conductive segments connected to the output lead for digit (4) and the conductive segments connected to the output lead for digit (8) are positioned in sectors designated (8) and (9); and d. the conductive segments connected to the output leads for digits (2) and (8) are positioned in sectors designated (0) and (4).

6. A binary coded readout device as defined in claim 3 wherein:

a. the wiper has four projecting arms, two of said arms each having a contact member which travels in a third and fourth path with respect to the axis of rotation, one of said arms has a contact member which travels in a second path with respect to the axis of rotation, and another of said arms has a contact member which travels in an innermost path with respect to the axis of rotation;

b. the contact member traveling in the innermost path will come to rest in each of said 10 sectors on a conductive segment connected to the common input lead;

c. the contact contact member traveling in the second path will come to rest on conductive segments connected: (1) to the common input lead in each of the sectors designated (0) to (7) inclusive; and (2) to the output lead for digit (4) in each of the sectors designated (8) and (9);

d. the contact member traveling in the third path will come to rest on conductive segments connected to: (1) the common input lead in each of the sectors designated (2) and (4); (2) the output lead for the digit (1) in each of the sectors designated (1), (3) and (5); (3) the output lead for the digit (2) in each of the sectors designated (6) and (7); (4) the output lead for the digit (8) in each of the sectors designated (8) and (9); and (5) the output lead Z in the sector designated (0); and e. The other contact member traveling in the fourth path will come to rest on conductive segments connected to: (1) the common input lead in each of the sectors designated (2), (5) and (0); (2) the output lead for the digit (1) in each of the sectors (1) and (3); (3) the output lead for the digit (2) in each of the sectors designated (6) and (7); (4) the output lead for the digit (4) in each of the sectors designated (8) and (9); and (5) the output lead Z in the sector designated 4.

* * * * *